(12) United States Patent
Polasa et al.

(10) Patent No.: US 12,437,304 B2
(45) Date of Patent: Oct. 7, 2025

(54) INTELLIGENT COORDINATION OF TRANSACTION PROCESSING IN A MULTI-DEVICE NETWORK

(71) Applicant: Bank of America Corporation, Charlotte, NC (US)

(72) Inventors: Puneetha Polasa, Telangana (IN); Bhagya Lakshmi Sudha Lavanya Mallidi, Hyderabad (IN); Udaya Kumar Raju Ratnakaram, Hyderabad (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/702,480

(22) Filed: Mar. 23, 2022

(65) Prior Publication Data
US 2023/0316289 A1    Oct. 5, 2023

(51) Int. Cl.
*G06Q 20/40* (2012.01)

(52) U.S. Cl.
CPC ....... *G06Q 20/405* (2013.01); *G06Q 20/4014* (2013.01); *G06Q 20/409* (2013.01)

(58) Field of Classification Search
CPC . G06Q 20/405; G06Q 20/4014; G06Q 20/409
USPC .......................................................... 705/44
See application file for complete search history.

(56) References Cited

U.S. PATENT DOCUMENTS

| | | | |
|---|---|---|---|
| 9,398,336 B2 | 7/2016 | Markley et al. | |
| 10,826,684 B1 | 11/2020 | Winter et al. | |
| 11,227,325 B1 | 1/2022 | Baral et al. | |
| 11,397,950 B2 * | 7/2022 | Manjunath | G06Q 20/409 |
| 2007/0204314 A1 | 8/2007 | Hasek et al. | |
| 2014/0074575 A1 * | 3/2014 | Rappoport | G06Q 30/0222 |
| | | | 705/14.51 |
| 2015/0019342 A1 | 1/2015 | Gupta | |
| 2016/0092872 A1 | 3/2016 | Prakash et al. | |
| 2016/0269330 A1 | 9/2016 | McEvoy et al. | |
| 2016/0292010 A1 | 10/2016 | Maesono | |

(Continued)

FOREIGN PATENT DOCUMENTS

| | | |
|---|---|---|
| CN | 1836228 A | 9/2006 |
| CN | 101868032 B | 10/2010 |

(Continued)

OTHER PUBLICATIONS

Mar. 30, 2023—(US) Non-Final Office Action—U.S. Appl. No. 17/702,492.

(Continued)

*Primary Examiner* — Hani M Kazimi
(74) *Attorney, Agent, or Firm* — Banner & Witcoff, Ltd.

(57) ABSTRACT

Rules and triggers for initiating and generating transactions can be dynamically and automatically created by a computing device based on learning behaviors for a knowledgebase. This knowledgebase may be created by storing historical transaction information for devices within a particular network such as an Internet of Things (IoT) network where devices are interconnected and capable of processing data and instructions. Such a network may be associated with a user or location or organization, and may conform to a specific communication protocol.

20 Claims, 8 Drawing Sheets

(56) References Cited

U.S. PATENT DOCUMENTS

| | | |
|---|---|---|
| 2017/0293901 A1 | 10/2017 | Savla |
| 2018/0158043 A1 | 6/2018 | Noë et al. |
| 2018/0322430 A1 | 11/2018 | Guha et al. |
| 2018/0330349 A1 | 11/2018 | Uhr et al. |
| 2019/0026716 A1 | 1/2019 | Anbukkarasu et al. |
| 2019/0362076 A1 | 11/2019 | Wang et al. |
| 2020/0167337 A1 | 5/2020 | Kurian et al. |
| 2020/0226566 A1 | 7/2020 | Wang |
| 2021/0065170 A1 | 3/2021 | Shriver |
| 2021/0065171 A1 | 3/2021 | Pliasunov |
| 2021/0065291 A1 | 3/2021 | Gaivironsky et al. |
| 2021/0078847 A1 | 3/2021 | Marten |
| 2021/0097523 A1* | 4/2021 | Phillips ............. G06Q 20/3227 |
| 2021/0174269 A1 | 6/2021 | Lee et al. |
| 2021/0201313 A1 | 7/2021 | Kumawat et al. |
| 2021/0287279 A1* | 9/2021 | Taffer ................ G06Q 30/0639 |

FOREIGN PATENT DOCUMENTS

| | | |
|---|---|---|
| CN | 108880797 B | 9/2021 |
| CN | 109347666 B | 9/2021 |
| CN | 114037438 A | 2/2022 |
| WO | 8909443 A1 | 10/1989 |
| WO | 2021174968 A1 | 9/2021 |

OTHER PUBLICATIONS

Nov. 9, 2023—(US) Non-Final Office Action—U.S. Appl. No. 17/702,460.

Dominique Guinard, "Interacting with the SOA-Based Internet of Things . . . Web Services", 2010, IEEE Transactions on Services Computing, vol. 3, No. 3, pp. 223-235. (Year: 2010).

Xiaolin Jia, "RFID Technology and Its Applications in Internet of Things (IOT)", 2012, School of Information Science and Technology, Chengdun, China, pp. 1292-1285. (Year: 2012).

Sep. 20, 2023—(US) Final Office Action—U.S. Appl. No. 17/702,492.

Mar. 11, 2024—(US) Non-Final Office Action—U.S. Appl. No. 17/702,492.

May 22, 2024—(US) Final Office Action—U.S. Appl. No. 17/702,460.

Aug. 20, 2024—(US) Final Office Action—U.S. Appl. No. 17/702,492.

Sep. 29, 2024—(US) Non-Final Office Action—U.S. Appl. No. 17/702,460.

Daeil Kwon, "IoT-Based Prognostic and Systems Health Management for Industrial Applications," 2016, IEEE Access, pp. 3659-3670.

Samaresh Bera, "Software-Defined Network for Internet of Things A Survey," 2017, IEEE Internet of Things Journal, vol. 4, No. 6, Dec. 2017, pp. 1994-2008.

Apr. 10, 2025—(US) Final Office Action—U.S. Appl. No. 17/702,460.

\* cited by examiner

INTELLIGENT COORDINATION OF TRANSACTION PROCESSING IN A MULTI-DEVICE NETWORK

BACKGROUND

Aspects of the disclosure relate to electrical computers, systems, and devices for interconnecting devices through a network, dynamic and automated transaction initiation and processing, and knowledge base development and maintenance.

Users make a multitude of transactions on a daily basis. From groceries to gas to household items to in-app purchases, users spend significant time swiping, hovering, scanning or entering payment information (e.g., a credit card number or a QR code). These payments may include processes such as one-time payments and/or other means of enhancing payment security. These collective transactions requiring user participation and attention are time-consuming and often distracts from other tasks in the user's life. Some devices allow for a user to select a button to generate a transaction that has pre-specified parameters such as quantity and product type. However, these devices still require users to monitor various device attributes or characteristics, for example, to determine when the transaction is to be initiated. Current devices are limited in the data that they store and how they process this data to determine future activities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to some aspects, devices in a multi-device network such as an Internet of Things (IoT) network may be configured for machine-learning processes. These processes may include creating a knowledge base of transaction-related information for the multi-device network. For instance, devices in a network such as an IoT network may each have a need to initiate certain transactions such as purchases or subscriptions for consumables or services or the like. A transaction processing platform may maintain a knowledge base of transactions requested by, requested for, and/or initiated by a device in the network. The knowledge base may include information such as the identity of the device with which the transaction is associated, an associated user, transaction amount (price and/or quantity), payment device, time of day, time of week, and the like.

In some aspects, a transaction processing platform may dynamically and intelligently apply behavior analysis and learning algorithms using the knowledge base to initiate and generate transactions for devices in the network without requiring user input. For example, the transaction processing platform may be configured to detect patterns of transaction behavior based on the information in the knowledge base and using pattern recognition algorithms and create triggers or events based thereon without user involvement. Transactions may then be initiated and/or executed based on these triggers, again without user involvement.

In some instances, devices in the network may be configured to generate transactions based on triggering events or conditions. For example, a device in an IoT network may receive a triggering event or otherwise determine a triggering event based on a transaction history. The device may then monitor for the triggering event or condition, and self-initiate a transaction based thereon. In some examples, user confirmation may be required once the transaction is generated by the device. In other cases, user confirmation might not be required.

In some arrangements, devices in the network may also select a payment device based on contextual attributes and factors. For example, a payment device may be selected based on benefits to a user, proximity to other devices or to a user, usage history and patterns, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
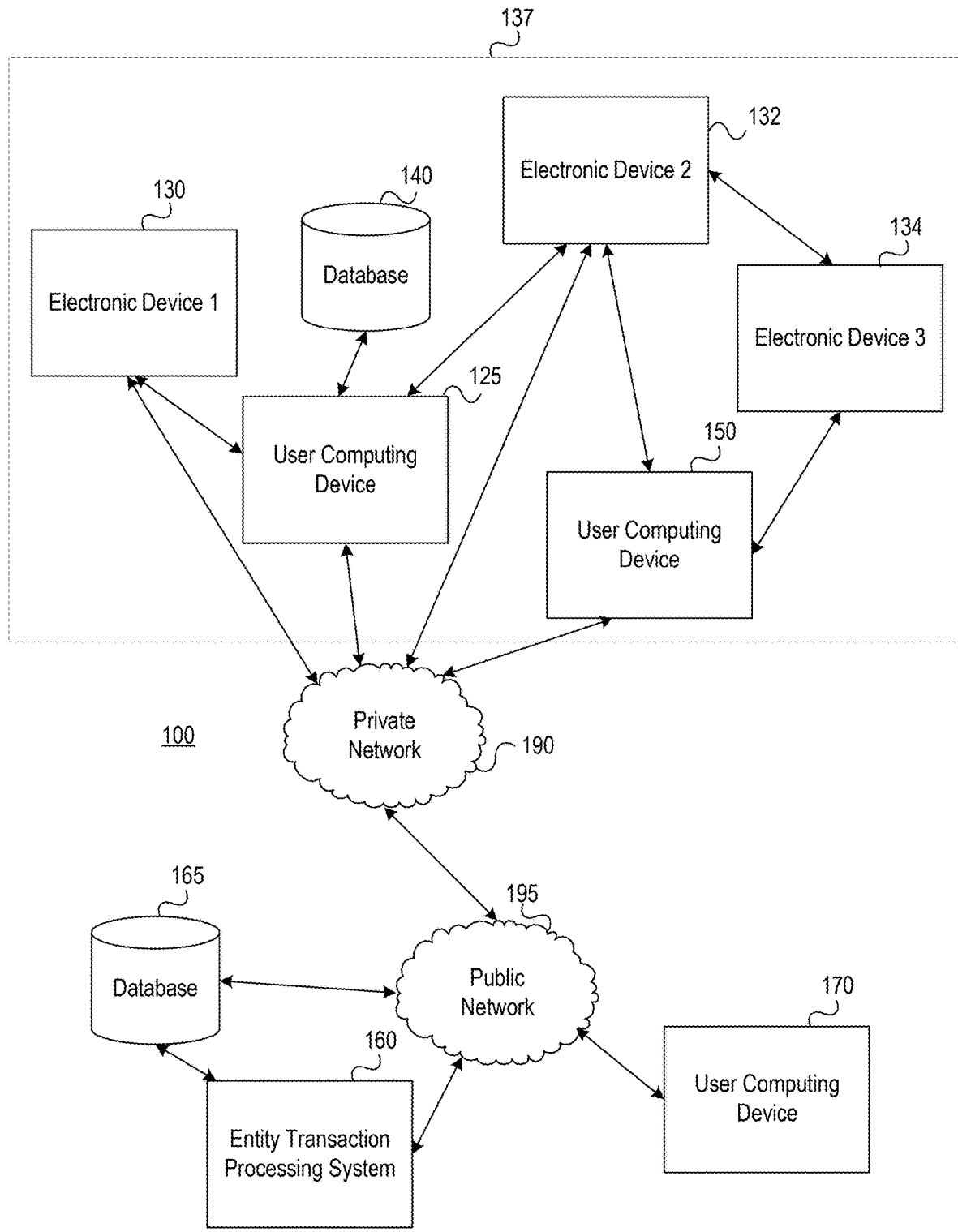
FIGS. 1A and 1B depict an illustrative computing environment for implementing dynamic transaction processing function in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, many devices have now been configured to have network connectivity and/or smart features allowing for inter-device communication. According to aspects described herein, such devices may apply machine-learning processes and algorithms to develop rules for initiating and generating transactions. Such machine processing and learning may help to alleviate users from having to manually monitor personal, business, or household needs. In some instances, allowing a platform or a device to automatically determine transaction events and to generate transactions may significantly simplify a user's everyday schedule.

For instance, a device in a home Internet of Things (IoT) network may have the intelligence (e.g., processing capabilities and algorithms) to analyze data and store information into a knowledge base. In one example, the device may include a coffee maker. The coffee maker may include processing elements that allow for it to determine when additional coffee pods, grinds or beans are needed. The coffee maker may be connected to a variety of other devices in the IoT network including other home appliances, vehicles, personal communication devices and the like. In some arrangements, the processing of transaction data and pattern analysis may be performed in a distributed fashion in the IoT network given the interconnected nature and interoperability of the devices therein.

In the network, a variety of transactions may be initiated and executed. A database may be used to store information associated with these transactions to build a knowledge base. The database may include various types of transaction information, which may be specified by the user and/or a financial entity, and/or may be defined based on a system setting.

Users may perform many transactions over the course of a week, a month, or a year. To alleviate at least some of these mundane tasks of manually creating transaction including inputting transactions parameters, selecting payment devices, etc., the knowledge base may be used to automatically develop transaction triggers and to generate and execute transactions. For example, a platform (which may include one or more devices in the network) may use the information in the knowledge base to identify patterns of transaction behavior. Based on these identified patterns, the platform may automatically generate triggering events or conditions for the initiation of a transaction. These triggers may be monitored and when the trigger conditions are met, a transaction may be automatically generated without user involvement. Additionally, or alternatively, the platform may intelligently select payment devices for a particular transaction based on various contextual parameters.

These and various other arrangements will be discussed more fully below.

Figure 1B:
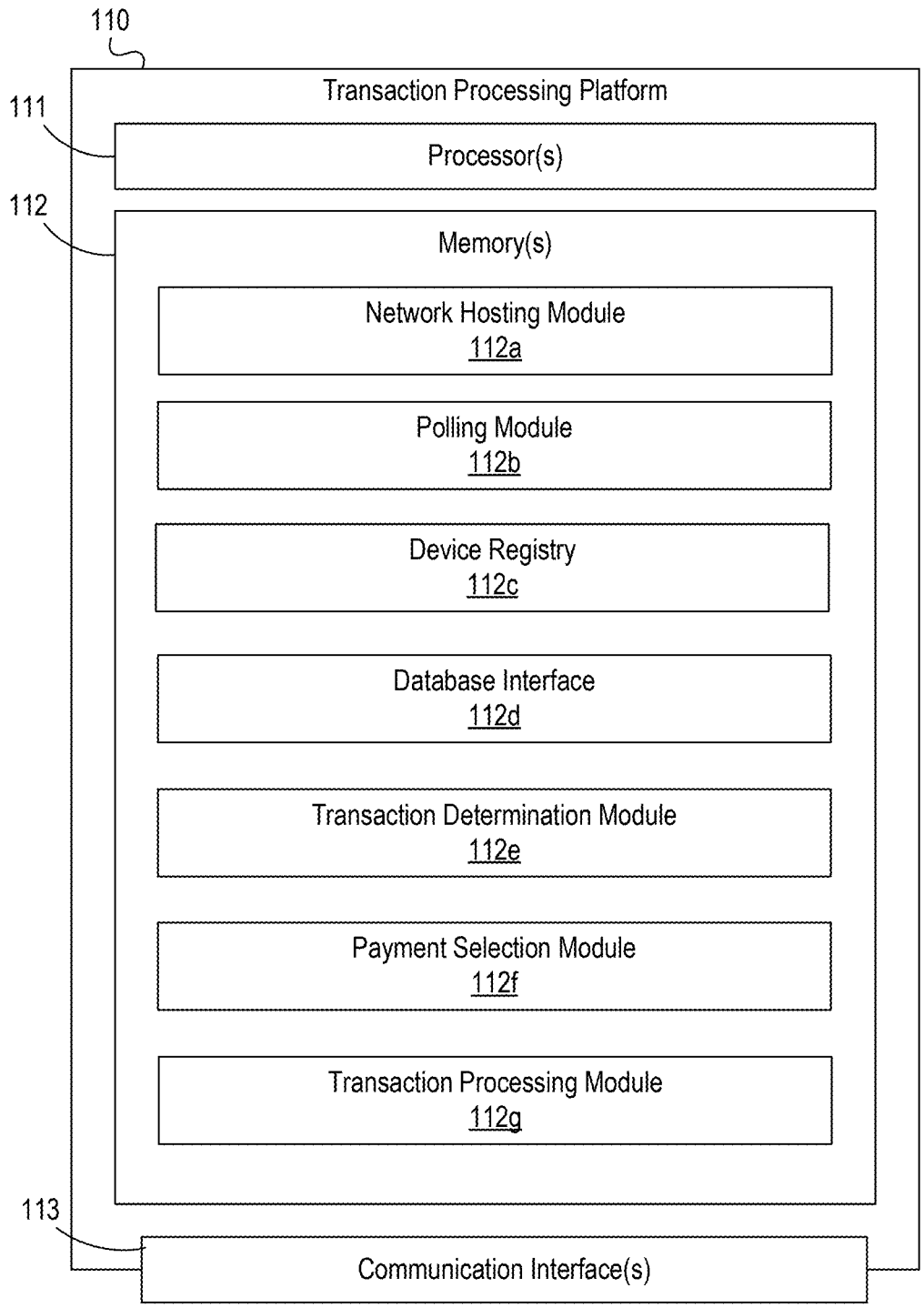

FIGS. 1A-1B depict an illustrative computing environment for implementing and using dynamic device selection and transaction processing functions in accordance with one or more aspects described herein. Referring to FIG. 1A, computing environment 100 may include one or more computing and electronic devices and/or other computing systems connected through one or more networks. For example, computing environment 100 may include user computing devices 125, 150 and 170, databases 140 and 165, other electronic devices 130, 132, and 134, and an entity transaction processing system 160. Electronic devices 130, 132, and 134 may include computing devices such as laptops, mobile phones, smartphones, tablets, as well as electronic appliances and devices such as refrigerators, washing machines, dryers, lighting devices, stoves, ovens, microwaves, and the like, and other electronic devices such as vehicles. Such devices may also include processors and communication interfaces with which the devices 130, 132, and 134 may communicate with each other and/or other devices. While the illustration of FIG. 1A includes particular numbers of devices, any number of systems or devices may be used without departing from the aspects described herein.

As mentioned above, computing environment 100 also may include one or more networks, which may interconnect one or more of electronic devices 130, 132, 134, user computing devices 125, 150, 170, databases 140, 165, and entity transaction processing system 160. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular user, location (e.g., home, office), and/or organization (e.g., a corporation, financial institution, educational institution, governmental institution, or the like) and may interconnect one or more computing devices associated with the user, location and/or organization. For example, private network 190 may be a user-configured home network that interconnects one or more of the devices at the user's home or otherwise associated with the user. This may include user computing devices 125, 150, and electronic devices 130, 132, 134. In one or more examples, a device such as electronic device 134 may connect to the private network 190 through another device such as user computing device 150. Additionally, or alternatively, devices may connect directly to one another using various communication technologies and protocols including Bluetooth, NFC, infrared and the like. For example, device 134 may be connected to computing device 150 using Bluetooth. In another example, database 140 may be connected to private network 190 through computing device 125. In other arrangements, database 140 may also be connected to private network 190 directly. The private network 190 may further provide access to a public network such as the Internet or another wide-area network (WAN) and devices external to the private network 190, including entity transaction processing system 160 and user computing device 170.

According to aspects described herein, one or more devices within the private network 190 may form a sub-network. In FIG. 1A, for example, user computing devices 125, 150 and electronic devices 130, 132, 134 collectively form a sub-network 137 of devices. A sub-network 137 may be hosted by one or more of the devices (e.g., user computing device 125) and use a particular network protocol. In one particular example, this sub-network 137 may be an Internet of Things (IoT) network that allows electronic devices 130, 132, and 134 to communicate with one another, with user computing devices 125, 150, and with external devices on the public network 195. This communication may include reporting usage data or performance information such as operating time of a washing machine, energy usage of a refrigerator, error reporting, temperature of an oven, user presence in the location, motion detection, security information, remaining gas and/or gas usage of a vehicle and the like. Device communications may also include transaction requests such as requesting the purchase of a consumable item. For a vehicle, this consumable may be gas or wiper fluid, while for a dryer this may include fabric softener. In other examples, a refrigerator may indicate when a water filter needs to be purchased while a washing machine may indicate when more detergent is to be purchased. In some instances, network 137 may be a separate network from private network 190 (rather than a sub-network). In such arrangements, the separate network would use one of the devices within that network to connect to private network 190 and/or to public network 195.

Within network 137, it may be that designating one or more devices within the sub-network 137 to facilitate transactions provides more efficiency in network communications as well as transaction security. Accordingly, computing device 125 and/or computing device 150 may be configured to serve as authorized transaction devices within network 137. The authorized transaction device designation may indicate that these devices have permissions, authorization and/or capabilities to perform transactions for one or more users. Accordingly, when a device within network 137 wishes to initiate a transaction, those transactions may be sent to and handled by one or more of the authorized transaction devices such as device 125 and/or device 150. In one example, an authorized transaction device (e.g., computing device 125) may be configured to provide intelligent, dynamic, and efficient identification of devices in the network 137 and device attributes, evaluation of device capabilities, and determining potential transactions for or one behalf of one or more of devices 125, 130, 132, 134, and 150 in network 137. To identify devices in network 137, the authorized transaction device may be configured to host or otherwise manage network 137, including its membership. When a new device wishes to join network 137, the device may be directed to the authorized transaction device (e.g., computing device 125) to receive authorization and network details. Once information about the new device is received or otherwise determined, the authorized transaction device may determine whether to approve the new device joining network 137. In some examples, this may require the new device to provide authentication information, such as a password or token specific to network 137 or to a user associated with network 137. If the new device is approved for membership, the new device information may be stored to a device registry storing device information of all member devices of network 137. The authorized transaction device may further provide connection and/or protocol information (e.g., packet structure, communication protocol, transaction-specific security protocols, network-specific header information, information for the other devices, and the like) to the new device so that it is able to communicate with other devices within network 137.

Upon a new device joining the network, authorized transaction device 125 may send out polling requests to identify and receive information about the device within network 137. Polling may include obtaining device attribute information such as processing power, processing load, storage capacity, battery level, battery capacity, and the like. In some instances, this polling may also indicate whether a device still exists within network 137. For example, if authorized transaction device 125 polls electronic device 134 and either receives a communication rejection message or receives no response, authorized transaction device 125 may determine that electronic device 134 is no longer part of network 137 and update the device registry accordingly. Additionally, device 125 may inform each of the other devices 130, 132, and 150 in network 137 of the updated membership of network 137. In some arrangements, devices within network 137 may proactive transmit device attributes and information to authorized transaction device 125 based on a triggering event or based on specified schedule. Triggering events may include when a processing load of the device changes by more than some percentage threshold, when an amount of remaining battery changes by more than some percentage amount, when a remaining amount of battery drops below a certain threshold percentage, when a memory capacity of the device changes by a percentage amount or decreases below a threshold amount, and the like and/or combinations thereof. Alternatively, or additionally, devices within network 137 may report device information every 30 seconds, every 5 minutes, every 30 minutes, every hour and the like. Other reporting schedules and triggers may be defined as needed or desired.

An authorized transaction processing device such as computing device 125 may be configured to log or otherwise store information about each transaction it processes. Accordingly, when a purchase is made by or on behalf of device 130, for example, the transaction details such as product type, purchase amount, time and date, payment account, merchant, merchant membership code and the like may be logged. In one example, this transaction information may be stored to a database such as database 140. Alternatively, or additionally, transaction information may be stored to a remote database such as database 165. Database 140 and/or 165 may further store user-specified transaction rules and parameter. For example, a user may set spending or number of transaction thresholds or limits for particular devices, payment accounts or devices, time periods, users, and the like and/or combinations thereof. In another example, a user may restrict purchases for (or by) a coffee maker to once a month and/or $100 per month. Further, a user may specify that certain payment accounts are to be used for certain types of transactions or for particular devices in network 137. In one example, a user may set a limit of $200 for a particular credit card. Accordingly, in one instance, a user may indicate that a grocery rewards credit card is to be used for all transactions for (or by) a refrigerator. In another example, a user may specify that all gas purchases must use a particular credit card providing gas purchase rewards or increased reward points for gas purchases. A variety of rules may be defined and specified as needed or desired by a user.

According to some aspects, devices in network 137 may intelligently and dynamically identify and initiate transactions based on transaction information collected in database 140 and/or database 165. For example, an authorized transaction device such as device 125 may identify one or more patterns of transactions from the transaction history stored in database 140. Such patterns may include identifying a product purchased, a device associated with the transaction, a quantity purchased, a transaction amount, a payment account and a frequency or schedule of purchases. Accordingly, in one example, a device such as device 125 or electronic device 130 may determine that a particular device (e.g., a thermostat) is routinely associated with purchases of 5 air filters every 3 months for a cost between $50 and $75. In another example, a pattern may be detected when gas is purchased for a vehicle on a weekly basis. A pattern may be detected based on a variety of heuristics and algorithms. In one instance, a pattern may be defined by the same purchase being made two times in a row. In another example, a pattern may be defined by the same purchase being made three times in a row. Pattern thresholds and algorithms may also be device or product-specific. For example, the same or substantially similar (e.g., same or similar product, quantity, merchant, purchase price, etc.) transaction for gas may need to be repeated at least three times to establish a pattern, while the same or substantially similar transaction for a coffee machine (e.g., coffee pods) may need to be repeated at least five times to establish a pattern.

Based on the patterns detected in the transaction history, a device may intelligently generate transaction schedules or triggers without user intervention. For example, a device (e.g., authorized transaction device and/or a vehicle), upon detecting a pattern of gas purchases every week, schedule a gas transaction request once a week. The transaction request may include a purchase amount (e.g., a number of gallons), a price per gallon or total purchase price, a payment account, and/or a specific merchant. In some arrangements, one or more of the transaction parameters may be defined based on user-specified rules. For example, the device may select a payment account based on a user-specified rule that indicates that all gas purchases are to be made with a particular payment account that provides rewards (or increased rewards) for gas purchases.

Transactions initiated by a device in network 137 may be communicated to an external transaction processing system such as entity transaction processing system 160 by the authorized transaction device such as device 125. Entity transaction processing system 160 may be or include one or more computing devices or systems associated with entities external to the user's network 190 such as a financial institution or a payment network. For example, entity transaction processing system 160 may be associated with an organization that provides one or more user accounts or payment devices (e.g., debit card, credit card, bank account, or the like). In some examples, multiple entity transaction processing systems may exist, with different transaction processing systems corresponding to different user accounts and/or payment devices or different groups thereof. Additionally, transaction processing system 160 may include or communicate with a database 165 for storage of data such as transaction information. In one or more arrangements, transaction processing system 160 may store or log all transaction information for transactions it processes.

Further, user computing device 170 may be a device associated with the user that is currently operating outside of private network 190. User computing device 170 may be used to interface with one or more devices in private network 190 or network 137 from outside of the user's private network 190. For example, a user may use computing device 170 to manually select a transaction processing device for network 137. In another example, a user may use computing device 170 to modify the selection algorithm for selecting the transaction processing device or a pattern recognition algorithm for generating transaction triggers or events. In yet another example, a user may use computing device 170 to join and/or approve new devices to network 137. User computing device 170 may also be used to initiate transactions through one or more devices in network 137. Similar functions may be available through any of the devices in network 137 as well.

Referring to FIG. 1B, transaction processing platform 110 may include one or more processors 111, memory 112, and communication interface 113. A data bus may interconnect processor(s) 111, memory 112, and communication interface 113. Communication interface 113 may be a network interface configured to support communication between transaction processing platform 110 and one or more networks (e.g., private network 190, public network 195, or the like). Memory 112 may include one or more program modules having instructions that when executed by processor(s) 111 cause transaction processing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of transaction processing platform 110 and/or by different computing devices that may form and/or otherwise make up transaction processing platform 110.

For example, memory 112 may have, store and/or include network hosting module 112a. Network hosting module 112a may store instructions and/or data that may cause or enable transaction processing platform 110 to manage a network of devices (e.g., an IoT network, a home-based local area network of devices, etc.) including monitoring membership, authorizing devices to join the network, facilitating communications between devices, specifying configuration and protocol parameters and the like. For example, network hosting module 112a may store rules for forwarding or filtering communications between devices, for setting permissions on device actions, for controlling reporting by the devices in the network (e.g., network 137) and the like.

Transaction processing platform 110 may further have, store and/or include polling module 112b. Polling module 112b may store instructions and/or data that may cause or enable transaction processing platform 110 to obtain information about each device in network 137 and to identify networks that may want to join network 137. For example, polling module 112b may include instructions for transmitting a signal to one or more devices, requesting certain information about those devices. In some instances, that signal may be transmitted to known devices. In other instances, the signal may be transmitted within a physical range (e.g., 10 feet, 50 feet, 100 feet, 300 feet, etc.). Polling module 112b may also store instructions for controlling a frequency and schedule of when devices are polled. This may also include triggering rules or events for executing the polling process.

Device registry 112c may be configured to store device information and identify device membership within the network (e.g., network 137). For example, device registry 112c may store information such as a device identifier (e.g., device name, a username for a user associated with the device, etc.), a network identifier (e.g., IP address, MAC address, etc.), device model and the like. The device registry may be accessible to all devices in the network, or might only be accessible to platform 110. In some instances, platform 110 may grant access to perform transactions through or otherwise interact with network 137 and the devices therein to a subset of devices in network 137 and/or to devices not in the network 137 (e.g., user device 170). In some instances, device registry 112c may also store information identifying the device (or devices) selected to be the transaction processing device for network 137.

Database interface 112d provides a conduit through which the transaction processing platform may access information stored in a separate storage facilitate such as database 140 or 165 of FIG. 1. In some instances, database interface 112d may be an internal interface to an internal database (part of or separate from memory 112). Platform 110 may invoke this interface 112d in order to store or retrieve data from one or more databases. For example, anytime a transaction is processed through platform 110 (e.g., by transaction processing module 112g), the parameters and data associated with that transaction may be stored to a database using interface 112d. In another example, when platform 110 needs information about past transactions (e.g., for transaction determination module 112e or payment selection module 112f), platform 110 may invoke interface 112d to obtain the desired information. Interface 112d may include wireless or wired interfaces including an internal bus, wireless interface cards, wired network cards and the like and/or combinations thereof.

Platform 110 may include a transaction determination module 112e to intelligently, automatically and dynamically formulate and initiate transaction requests on behalf of a user or device. Transaction determination module 112e may be configured to analyze information associated with past transactions and to infer or otherwise identify patterns or rules from the past transactions. The transaction determination module 112e may recognize patterns and generate automatic transactions using a variety of algorithms and heuristics. For instance, transaction determination module 112e may apply established rules such as identifying a pattern when the user makes the same or a substantially similar transaction a certain number of times (e.g., three times, five times, 10 times). In some instances, those pattern detection algorithms or rules may be defined based on user input and specifications. Such automated triggers or events alleviate the need for a user to constantly monitor inventory and to manage the timing of certain transactions, particularly as they relate to devices within the user's network. For example, transaction determination module 112e may determine that the user has refilled 15 gallons of gas for a vehicle every week for the last four weeks. Based on this history and pattern, transaction determination module 112e may automatically generate a gas purchase transaction for the vehicle on a weekly basis for 15 gallons. In another example, transaction determination module 112e may determine that the user routinely orders groceries every three days, and may further identify items (and quantities thereof) that the user purchases every time or a majority of the time. Based on these determinations, module 112e may automatically initiate a grocery order including those identified items without requiring user input or intervention for that particular transaction or series of transactions. In some arrangements, the platform may optionally request confirmation from a user upon generating a transaction request based on the algorithms described herein. Similarly, the platform may also request confirmation from a user upon generating a transaction triggering event or rule. In other examples, the user may independently audit triggers that have been automatically generated and have the ability to override, modify, and/or cancel those triggers.

Platform 110 may include payment selection module 112f configured to select a payment device for a transaction. A payment device is not limited to a physical payment device such as a credit card or electronic payment device, and may include payment accounts, payment channels, and the like. For example, when a transaction is initiated or requested, payment selection module 112f may select a payment device with which to execute the transaction. In some examples, payment selection module 112f may select a payment device based on user-specified rules. In other examples, payment selection module 112f may select a payment device based on a transaction history. Accordingly, if the transaction history indicates that a first payment device is typically used for purchases for a first device in the network, payment selection module 112f may similarly select that first payment device when another transaction is requested for the first device. In another example, if the transaction history indicates that a first payment device is typically used for purchases of a particular type of product, payment selection module 112f may similarly select that first payment device when another transaction is requested for that particular product type.

In one or more arrangements, payment selection module 112f may be configured to apply context-based payment selection. For example, payment selection module 112f may determine existing payment conditions in selecting the payment. These payment conditions may include costs, offers, discounts, rewards, and the like, which may change in real-time. Accordingly, the cost or benefit of using one payment device might change between two different transactions or transaction times. Payment selection module 112f may thus monitor for these attributes of one or more payment accounts and associated payment channels to identify the most advantageous payment option. In a first example, different payment accounts may provide rewards or discounts for certain types or categories of purchases. In a second example, different payment channels or payment networks may have different charges for processing transactions. In a third example, merchants may provide offers through specific payment channels or payment types and not others. These offers may include extra reward points or discounts on a purchase. Moreover, each of these incentives and charges may change from one transaction to the next. Accordingly, a payment selection system and process may determine which of these payment accounts and channels would be most beneficial (e.g., financially, approval time, etc.) to the user.

Transaction processing platform 110 may further have, store and/or include transaction processing module 112g. Transaction processing module 112g may be configured to authorize transactions and transmit those transactions through a payment channel. For example, transaction processing module 112g may determine whether a transaction is within a specified spending limit or if the type of transaction is allowed based on user-configurable rules and/or intelligent machine learning algorithms. Transaction processing module 112g may store instructions and/or data that may cause or enable the platform 110 to generate and transmit one or more instructions to one or more merchant systems to process the transaction, generate and transmit one or more instructions to modify an account or ledger, or the like. Transaction processing module 112g may also perform authentication processes to generate a request for authentication data or to request authentication (e.g., of a transaction-initiating user) and transmit the request to a device, such as entity transaction processing device 160 (FIG. 1) or another authentication server (not shown). The authentication data requested may be data associated with a selected payment device. In some examples, the user may be requested to enter authentication data such as credentials into a display rendered by the transaction processing platform 110 and/or a user device.

As discussed, according to one or more aspects, a transaction coordination and processing platform may facilitate the initiation and processing of transactions for devices in a network such as an IoT network. The network may be defined by a particular protocol and use various types of wired and wireless communication schemes including BLUETOOTH, Wi-Fi, ZigBee, PowerLine, Ethernet, NFC and the like and/or combinations thereof. In some arrangements, device attributes and information may be obtained by polling each device. This information may include transaction history information, processing power, memory capacity, network connectivity, battery level and the like. The platform may determine and initiate transactions autonomously and intelligently based on the transaction history and/or device attributes without user intervention. Determining and initiating transactions may include specifying a product to purchase, identifying a device for which the transaction is intended, determining a purchase quantity, determining a purchase amount, and selecting a payment account or device to be used for the transaction.

Figure 2:
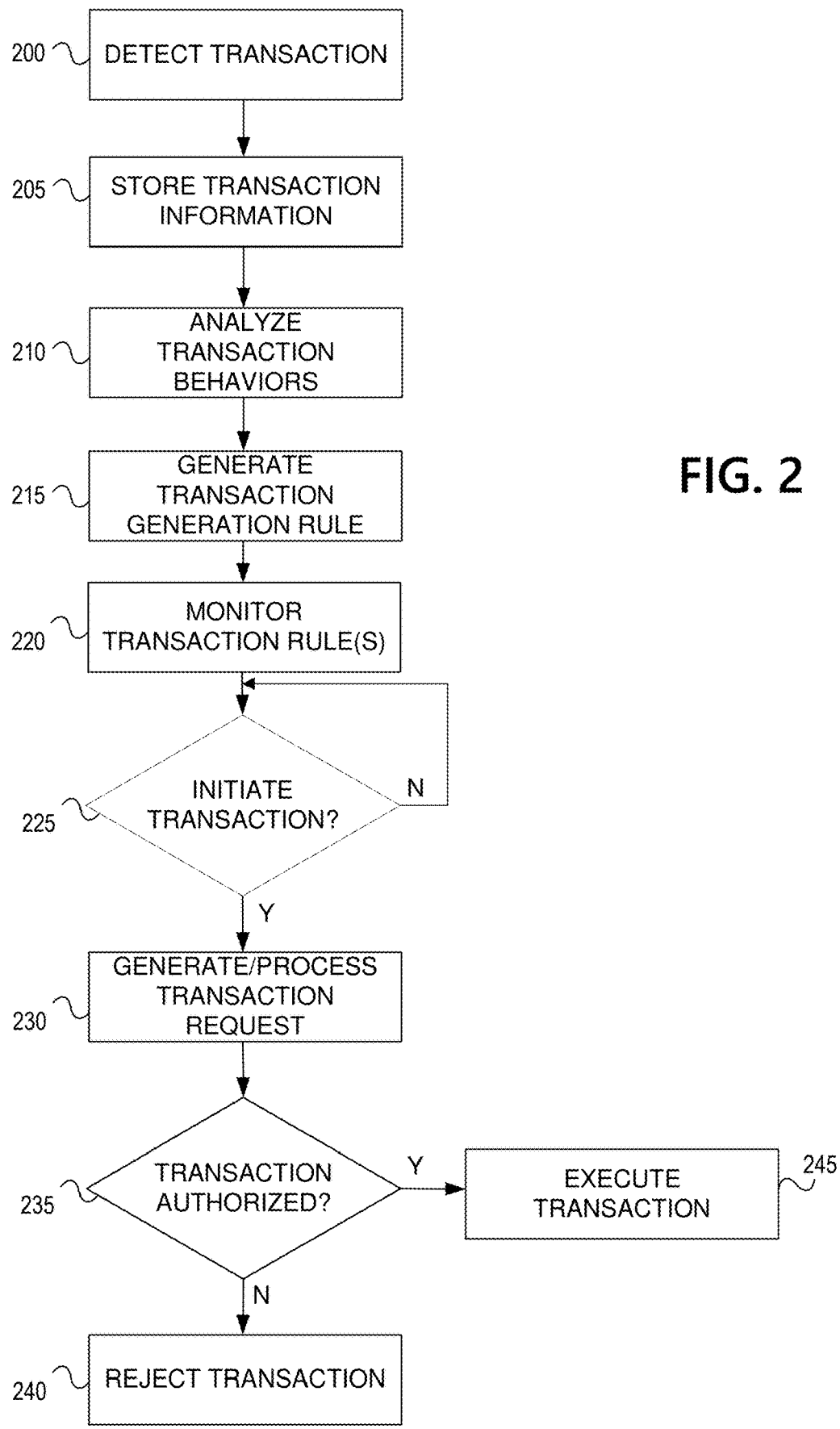
FIG. 2 is a flowchart illustrating an example method for performing dynamic polling and device selection according to one or more aspects described herein.

FIG. 2 is a flowchart illustrating a process for intelligently and autonomously initiating transactions in a network. In step 200, a transaction processing platform such as platform 110 (FIG. 1B) may detect a transaction requested by or for a device in the network (e.g., network 137 of FIG. 1A). The processing platform may detect a transaction in a variety of ways, including by serving as a hub for executing transactions for network devices. Accordingly, when a transaction is requested by or for a device in the network, that transaction may be requested through the processing platform. Alternatively, or additionally, the processing platform may receive notifications for every transaction performed in the network by rule. That is, the network may include certain protocols that must be followed by each device. Such a protocol may require each member device in the network to report transactions to a particular device or platform.

In step 205, the transaction processing platform may store transaction information into a database. The transaction information may include various data including a type of product ordered, a transaction value or amount, a quantity of product ordered, one or more identifiers (device and/or network) of a device associated with the transaction, a transaction identifier, a merchant, and/or a payment account or device. Additionally, the transaction processing platform may record a time and a date of the transaction. Moreover, the transaction processing platform may store a user identifier associated with the transaction if, for example, multiple users are able to execute transactions through the network. In yet other examples, transaction information may also specify a type of security protocol used for requesting or executing the transaction. In some examples, instead of or in addition to the transaction processing platform storing transaction information into a database, each of the devices initiating a transaction may store its own transaction information into the database.

In step 210, the transaction processing platform may determine one or more patterns of transaction behavior from the information stored in the transaction database. In one example, the transaction processing platform may analyze transaction history on a device-by-device basis to identify possible patterns. In another example, the transaction history may be analyzed on a merchant-by-merchant basis or a payment device-by-payment device basis. Pattern detection may use or otherwise apply a variety of computer algorithms. For example, the platform may detect transactions that are repeated more than two times, more than five times, more than 10 times or the like. Such repetition of a transaction may constitute a pattern. In some examples, the platform may have certain parameters for detecting whether one transaction is the same or substantially similar to another transaction. In some arrangements, the platform may require that certain parameters or attributes of the transaction be met exactly. These parameters may include a product type or category, a quantity of the product, a merchant, and the like. For other parameters, the platform might only require matching within a threshold range. For example, the platform might only require a quantity of a product to match within 10% or 20%. Similarly, the platform might only require a purchase cost to be within some threshold range such as 10% or 15%.

In some arrangements, the transaction processing platform may also learn and update its pattern detection algorithms based on transaction initiation rules manually created by a user or other user input. The updating of such algorithms may include identifying transactions in the transaction history that correspond to the user-created rule, and determining a parameter or common parameter value across these transactions. The platform may then use that common parameter or parameter value to update the thresholds or factors in its pattern identification algorithm. For example, if the system receives a user-created rule to automatically purchase 1 gallon of laundry detergent every week, the platform may analyze the transaction history to identify past transactions that match this rule. If, for example, the platform identifies three instances where the washing machine in the IoT network initiated a purchase of 1 gallon of laundry detergent, each instance being separated by a week, the platform may update its pattern detection threshold to detect a pattern where at least three instances of a particular transaction at equal intervals exist in the transaction history. In another example, the three previous purchases of laundry detergent might not have been at equal intervals. Instead, the purchases might have been at one-week intervals plus or minus a day (or two days, or three days, etc.). In such a case, the platform may determine that a pattern might still exist where transactions are not at exactly the same intervals, and instead allow variation in the time period between past transactions of up to 1 day. The platform may similarly learn and apply acceptable ranges for pattern detection with respect to purchase quantity, transaction cost, and the like. The platform might also learn and apply algorithms that detect transaction patterns based on transactions being of the same product category and not just transactions of the exact same product. Again, this may be learned based on a user manually creating a transaction rule for a product category and in light of the transaction history including multiple transactions for different products of the same product category.

In some arrangements, pattern detection algorithms may also be updated when the user provides input, such as approval or disapproval of a created transaction-creation trigger. For example, the platform may automatically create a trigger for purchasing 4 air filters every month based on a transaction history showing two instances where 4 air filters were purchase and at an interval of one month. However, if a user elects to override or modify this automatically created trigger, the platform may modify its pattern detection algorithms to increase the number of repeat transactions required (e.g., to three or four of the same transactions) to qualify as a pattern. As one will appreciate, a variety of pattern detection rules and parameters may be learned based on the stored transaction history alone, as well as based on a combination of user input and the stored transaction history information.

According to some aspects, the transaction processing platform may also detect patterns based on other device information or device-sensed information. For example, a device in the network may have sensors to determine inventory levels of particular consumables or products. In one instance, a vehicle may be able to report a gas level. In another example, a coffee machine may be able to detect how many coffee pods are remaining (e.g., weight sensor or optical sensor). In another instance, a device may be able to determine a remaining inventory based on knowing how many products were purchased and how many of those products have been used. In yet another example, a furnace or thermostat may have a sensor to detect each time an air filter is replaced. Accordingly, the furnace or thermostat (or another device monitoring inventory) may determine how many filters remain in inventory based on the usage information.

In step 215, the transaction processing platform may generate one or more transaction rules based on the identified patterns from step 210. For example, the transaction processing platform may define a rule for ordering one water filter for the refrigerator (connected to the IoT network) once a month. In another example, the transaction processing platform may define a rule for pre-authorizing a 17-gallon gas purchase for a particular vehicle once a week. In yet another example, the platform may define a rule for generating bi-monthly orders of coffee pods in a particular variety and quantity based on patterns identified in the transaction history. In still another example, the platform may define a rule for purchasing gas upon detecting a gas level to be below a specified threshold (e.g., three gallons, two gallons, etc.). These rules may also specify a payment account or device to be used for the transaction, a merchant, a security protocol to be used for transmitting transaction information and the like and/or combinations thereof.

In step 220, the transaction processing platform may monitor the transaction rules on a continuous, periodic or other basis to determine, in step 225, whether a particular condition has been met for initiating a transaction. For example, the condition may be a particular time, day, or date. In another example, the condition may be detecting an inventory level of a particular product to have fallen below a particular threshold. If one of the rules or conditions is met, the transaction processing platform may generate a corresponding transaction request in step 230 without requiring user input or other intervention. The transaction request may include a variety of parameters including a product identifier, a quantity, a merchant, a price or cost, an identifier for the device with which the product is associated, authentication or validation information (e.g., user account credentials), security protocols such as encryption and communication protocols, and the like. In one or more arrangements, the transaction processing platform may cause a device to initiate and generate the transaction request instead of generating the transaction request itself.

In step 235, the platform may determine whether the requested transaction is authorized. This may include determining whether the transaction parameters satisfy conditions set by the user. For example, a user may define certain limits for spending or restrict certain devices to certain payment accounts or devices. These restrictions or rules may be device-specific, merchant-specific, payment-channel (e.g., account or payment device) specific, user-specific and/or combinations thereof. Restrictions or rules may also define certain limits based on whether certain network communication protocols are being used. For example, a user may define a higher spending limit for transactions that use SSL or a VPN to execute a transaction, while transactions that do not use such communication protocols may have a lower spending limit. The intended communication protocol may be defined as part of the transaction request. The ability to define rules is not limited to the user. Rules may also be specified by a financial institution, payment account holder, merchant, and the like. Accordingly, in some instances, the transaction request may also be communicated to an external entity for pre-authorization before the transaction is submitted or executed.

If the platform determines that the transaction is not authorized based on these authorization rules, the platform may reject the transaction in step 240, which may include notifying a user of the rejection or denial. Additionally, or alternatively, the platform may automatically modify the transaction request to satisfy the conditions if possible and re-authorize the modified transaction. For example, the platform may modify the network communication protocol associated with the transaction request to correspond to a more secure communication protocol. In another example, the platform may modify a quantity of product ordered so that a spending limit is not exceeded. In yet another example, the platform may select a different payment device for the transaction request to satisfy a user-defined rule limiting what payment devices may be used for a particular type of transaction. According to some arrangements, the platform may send the unauthorized transaction request to a user for manual modification and/or approval (e.g., manually overriding the automatic rejection). In other arrangements, the platform may simply reject the transaction request, optionally notifying the user and deleting the corresponding transaction generation rule (if one exists).

In step 245, the transaction processing platform may execute a transaction upon determining that it is authorized, by forwarding relevant parts of the transaction request to the appropriate entities. For example, the platform may forward payment account and account credentials to a financial institution to authorize payment, while forwarding product information (identifier and quantity) to a merchant. In some arrangements, the transaction request may be sent through a payment channel such as a financial institution holding a payment account to the merchant. In response to sending the transaction request, the platform may receive a confirmation (e.g., by the payment channel and/or the merchant) which may also be provided to a device associated with the transaction.

The processes described in FIG. 2 may be distributed among multiple devices within the multi-device network. For example, within an IoT network, the devices may be configured to independent communicate with one another and to be able to distribute tasks between them. Such coordination and distribution of tasks may be used, for example, where one device may have a high processing load, low storage space, or weak network connectivity, and therefore need or want a second device in the IoT network to handle execution of a process (e.g., pattern detection, transaction processing, etc.). Distributed computing may be managed by using device status information that may, in one or more examples, be determined using the polling processes described herein.

Figure 3:
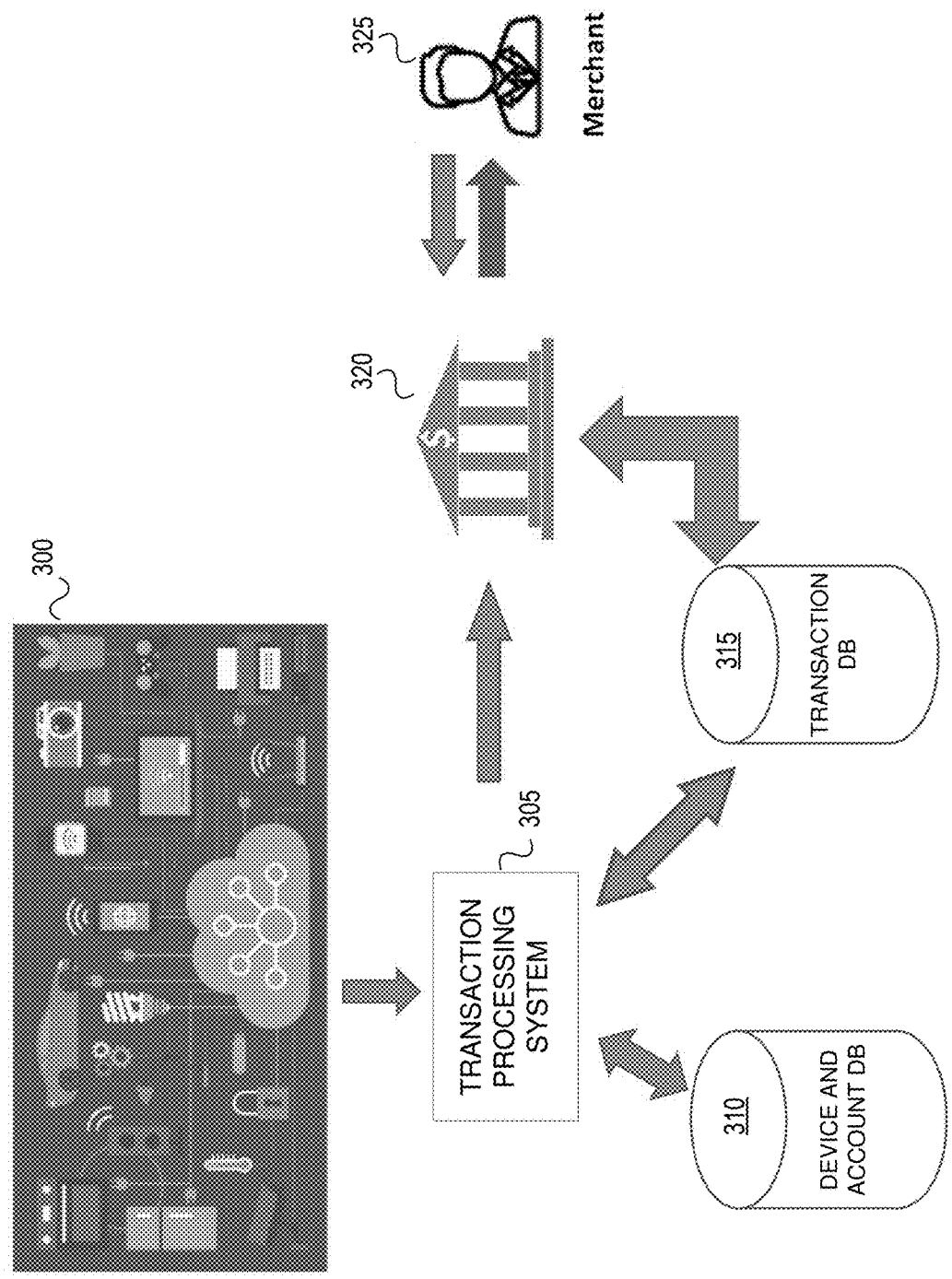
FIG. 3 illustrates an example device selection and transaction process flow according to one or more aspects described herein.

FIG. 3 illustrates a system diagram illustrating the various devices and modules associated with transaction processing according to aspects described herein. As noted herein, transaction may be initiated in a network of devices such as an IoT network. The devices within IoT network 300, for example, may be smart devices that each have network communication capabilities and that may process certain information, rules, and instructions. In some examples, the devices may communicate using an IoT network protocol that predefined messaging (e.g., packet) structure as is described in more detail below. The devices in network 300 may be connected to a transaction processing system 305. The transaction processing system 305 may be part of a device in network 300 or may be an external device within the same location as network 300. In one or more examples, transaction processing system 305 may be designated by a user or by the network 300 or by another system to handle transactions on behalf of the devices in network 300. This may alleviate the processing load, and hardware and software requirements of the other devices in network 300. In some arrangements, the transaction processing system 305 may be a distributed system that operates across multiple devices, both external and internal to network 300. Although FIG. 3 only depicts a single transaction processing system 305, multiple transaction processing systems may also be configured and used.

Transaction processing system 305 may receive transaction requests from devices in network 300 and process those transactions. Processing the transactions may include confirming that the transaction requests satisfy one or more conditions (e.g., are authorized) based on data stored in database 310. In some cases, database 310 may store device and payment account information. For example, database 310 may indicate which payment accounts may be used for transactions by or for a particular device of network 300. Database 310 may also store transaction limits (e.g., number of transactions per period of time, spending limit per transaction, spending limits per time period, etc.). Additionally, or alternatively, database 310 may specify security or communication protocols that must be used for various transactions or types of transactions. In some examples, certain security or communication protocols may be required by certain payment channels or merchants.

Transaction processing system 305 may further have access to a transaction database 315 which stores a record of transactions performed by the transaction processing system 305. Transaction database 315 may also be accessed by a financial institution such as payment provider 320. When a transaction request is authorized, the transaction processing system 305 may communicate the request (or portions of the request) to payment provider 320 to process payment. Accordingly, in some arrangements, either transaction processing system 305 or payment provider 320 or both may store records of transactions into database 315. Additionally, or alternatively, transaction processing system 305 and payment provider 320 may communicate according to various protocols. In one example, payment provider 320 may require that all transaction be communicated over VPN. Accordingly, transaction processing system 305 may be configured to establish a VPN using user credentials with the payment provider 320 and transmit transaction information therethrough. In other examples, payment provider 320 may require a certain messaging format for transactions or certain encryption protocols. Accordingly, transaction processing system 305 may be configured to use such formats or encryption protocols.

Upon receipt of a transaction request, payment provider 320 may authorize the payment and subsequently send transaction information to a merchant or vendor such as merchant 325 with an indication that payment is authorized. In some examples, the payment provider 320 may also send a confirmation to transaction processing system 305 that payment is confirmed. In other examples, payment provider 320 may wait until merchant 325 has confirmed the order and provide confirmation of both aspects of the transaction at one time. Merchant 325 may process the order and transmit a confirmation (or rejection) to payment provider 320 and/or directly to transaction processing system 305. In some configurations, transaction processing system 305 may communicate directly with each of payment provider 320 and merchant 325. In one example, transaction processing system 305 may send a payment authorization request to provider 320 while sending product ordering information to merchant 325. In this example, provider 320 may be requested to send payment authorization to merchant 325 upon validating the payment. Alternatively, provider 320 may send confirmation to transaction processing system 305 which may in turn send that confirmation to merchant 325.

Upon receiving confirmation of that the transaction request has been processed and authorized, transaction processing system 305 may store information for that transaction request into database 310. Additionally, system 305 may notify a transaction-initiating device and/or a user that the transaction has been processed and confirmed by merchant 325.

Figure 4:
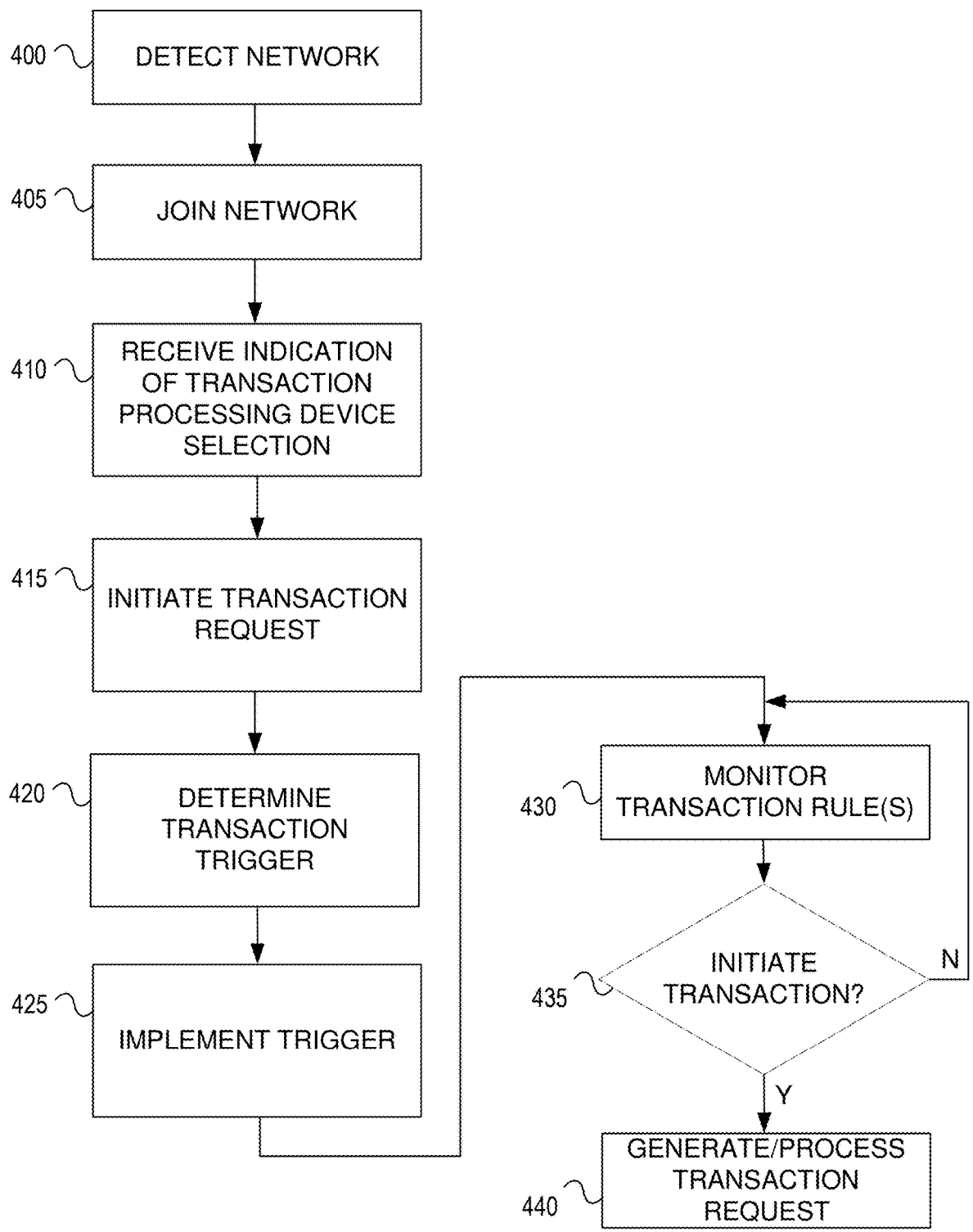
FIG. 4 is a flowchart illustrating an example method for generating transaction triggers and transactions, and executing a transaction according to one or more aspects described herein.

FIG. 4 is a flowchart illustrating a process whereby a device may join a network and conduct transactions therethrough using a transaction knowledge base. In step 400, for example, a device may detect a network within its vicinity. The device may detect the network in a variety of ways including by receiving a broadcast message identifying the network to devices within a particular range and/or receiving network identification information from another device that is an existing member of the network. In step 405, the device may join the network. Joining the network may include providing a network manager with information about the device including power level, processing load, processing power, network connectivity, installed software, installed hardware, security protocols, memory capacity and the like. In step 410, the device may receive a message from a device selection system identification of an authorized transaction processing device for the network. In some arrangements, the message may also provide transaction parameters such as spending limits, permitted types of transactions, permitted products, allowed times for transactions, and the like.

In step 415, the device may initiate a transaction request. For example, the device may receive instructions from a user to purchase a certain quantity of a particular product, and the device may send the request to the authorized transaction processing device for execution and confirmation. In some arrangements, the device may also be responsible for storing the transaction parameters into a knowledge base storing a transaction history for the network, for a household, for the device, for an organization, and/or for an associated user. Additionally, or alternatively, the device may activate or otherwise configure secure communication channels for communicating transaction information to the authorized transaction processing device and/or for storing the transaction information to the knowledge base. For example, the device may be configured to execute a virtual private network (VPN) and/or encrypt transaction information using a secure socket layer (SSL) protocol or the like.

In step 420, the device may determine a transaction trigger for generating one or more transactions. In one example, the device may analyze the transaction history in the knowledge base and generate its own triggers. In another example, the device may receive triggering event information or definitions from another device or system such as the authorized transaction processing device and/or another entity hosting and/or managing the knowledge base. Upon determining a transaction trigger, the device may implement the trigger in step 425. In some arrangements, the device may request approval from the user for implementing the automatically defined triggering event and conditions. Optionally, the user may be allowed to make modifications to the conditions or other parameters of the trigger before implementation. Additionally, or alternatively, the user may have the option to reject the created trigger.

In steps 430, 435, and 440, the device may then monitor the transaction rules to see if a triggering condition has been met and subsequently generating a transaction request if so. These steps are similar to steps 220-230 discussed above with respect to FIG. 2, and similar processes may be performed as part of steps 430-440.

Figure 5:
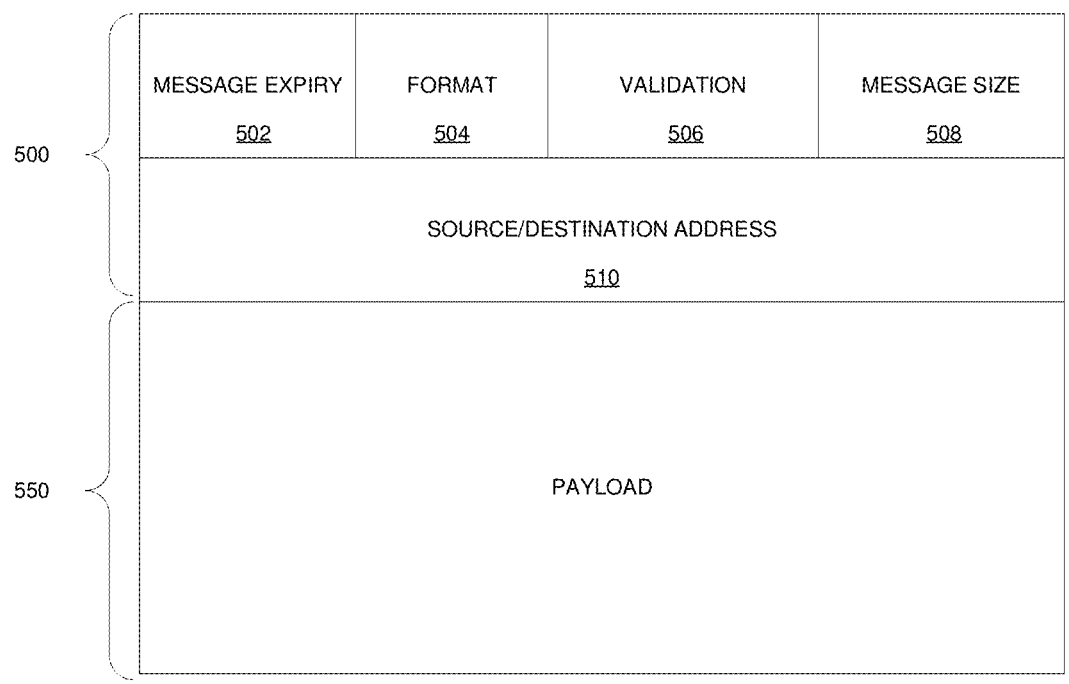
FIG. 5 illustrates an example packet structure for communications between devices in a network according to one or more aspects described herein.

FIG. 5 illustrates an example packet structure for communications between devices in the network. Devices in the network may communicate with one another to provide status information, usage data, capability information, network connectivity status, transaction information, authentication information, network connection information and parameters, and the like. The packet structure may include packet header 500 storing various information and parameters such as message expiry 502, format 504, validation information 506, message size 508, and source and destination address information 510. Source and destination address information 510 may include a network or device identifier for the source of the message as well as a network or device identifier for the intended destination of that message. In some instances, messages may be communicated through intermediary devices. Accordingly, source and destination address information 510 may assist in routing the message to the correct destination and in identifying the original communication source. Message expiry 502 may indicate when the message is set to expire. For example, a message may include security information (e.g., codes, passwords, one-time keys) and/or transaction information that is only effective for a certain period of time. This message expiration may be defined by the source communication device or may be a default time period specific (e.g., specified by) the network.

Message header 500 may further include format 504 that specifies the format of the contents in the payload. For example, format 504 may indicate that the content of the payload is in JSON format or XML format. A variety of other message formats may be used and indicated in header section 504. Validation information 506 may provide communication security by storing a code or other security mechanism (hash, key, etc.) so that a destination or intermediary device can confirm that the message is authentic. In some cases, validation information 506 may include a device-specific validation code or identifier. Additionally, or alternatively, validation information 506 may include a key or code issued by a network host so that all communications can be verified as originating from an authorized source (e.g., a member of the network). In some examples, validation information 506 may, additionally or alternatively, include an error check code (e.g., CRC) to ensure that the message received does not include any errors. Similarly, message size 508 may indicate a size of the payload so that a destination device may confirm that the entirety of the message was received.

Payload 550 is configured to store the content of the communication or message. For a transaction request, for example, payload 550 may include a payment identifier (e.g., payment account number, payment account password), purchase cost, order expiration, discount codes, user identification, and the like and/or combination thereof. Payload 550 may also carry other types of information depending on the type of communication. For example, if a thermostat were to exchange user presence information with a security system, payload 550 may include a status indicator such as "away" or "home" as well as a time at which a change in status was detected. In another example, payload 550 may include network connectivity information when one or more of the devices in the network of devices joins or leaves another network (e.g., a LAN, the Internet or another WAN, a VPN, etc.). In another example, a device may communicate inventory levels of consumables or other products in payload 550.

Figure 6:
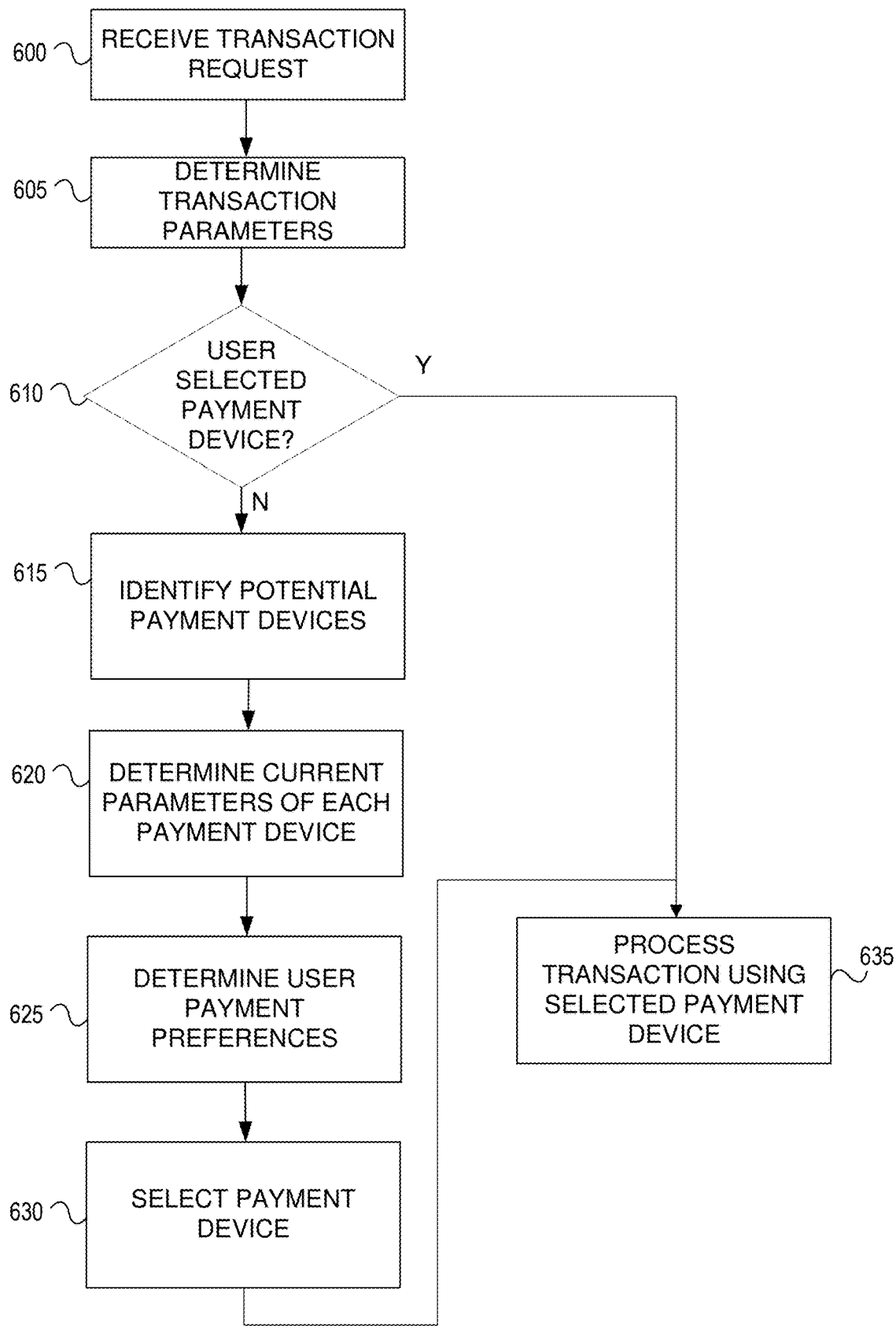
FIG. 6 is a flowchart illustrating an example method for selecting a payment device based on contextual information according to one or more aspects described herein.

FIG. 6 illustrates an example process by which a payment device may be contextually selected from multiple devices in a multi-device network. In step 600, for instance, a transaction processing device may receive a transaction request from a device within the network. This network may be an IoT network or other private network associated with a user, a household, an organization, a location, or a device. The transaction request may include a variety of parameters, which may be determined in step 605 by the transaction processing device. These transaction parameters may include merchant identification, product or service identifier (name, product code, etc.), a price, a subscription period (e.g., subscription to recurring product orders, subscription to digital content, etc.), account credentials (username, password), identifier for a device with which the transaction request is associated, a shipping type or speed, and the like. In step 610, the transaction processing device may determine whether a payment device has been specified by a user. For example, the transaction processing device may retrieve predefined payment device selection rules from a database based on the transaction parameters received. These rules may, for instance, indicate a particular payment device for use with a specific merchant, or a particular payment device for use for a particular category of purchases (e.g., gas, groceries, electronics, travel, etc.). Other examples include a rule for selecting a first payment device when the transaction cost is greater than $100 and using a second payment device when the transaction cost is $100 or less. A rule may also specify using a first payment device when purchasing products or services for a first device in the network and a second payment device when purchasing products or services for a second device in the network. Rules may also be user-specific such that transactions associated with a first user use a first set of payment device selection rules while transactions associated with a second user use a second set of payment device selection rules.

If a payment device has not been specified for the transaction request, the payment processing system may select a payment device using various contextual information beginning at step 615. In step 615, the payment processing system may identify one or more (or all) available payment devices registered in the system. These payment devices may include online payment accounts (e.g., bank accounts, peer-to-peer money transferring services, etc.) or physical devices such as credit cards, NFC devices, RFID tags, etc. In step 620, the payment processing system may determine one or more attributes of each payment device. These attributes may include security features such as physical security devices (e.g., smart chips), encryption protocols, rewards associated with the device (e.g., cash back rewards, reward points, etc.), discounts or other offers through each device, a cost associated with the device (e.g., for an interchange through which the payments would be processed for that device), a payment processing speed, and the like. For example, the payment processing system may calculate a value of rewards provided by a first credit card and a value of rewards provided by a second credit card based on an exchangeable dollar value.

Location of a payment device may also be considered as a contextual parameter. For example, payment devices co-located with the device corresponding to the transaction request may be preferred. In another example, payment devices in proximity to the transaction processing or payment processing system may be preferred. Accordingly, payment devices that are located remotely from the device associated with the transaction or located remotely from the transaction processing system may be less preferred. In yet another example, payment devices located in proximity to a user may be given preference. In some arrangements, the contextual parameters may be assigned a financial benefit value or cost that allows for comparisons across the various devices and between different types of device or contextual attributes. Accordingly, location or type of security protocol (e.g., communication protocol or encryption) may be assigned a financial value.

In step 625, the payment processing system may further determine user preferences. User preferences may serve as another selection factor. For example, a user may prefer to minimize transaction costs. In another example, a user may prefer to maximize rewards earnings. In yet another example, a user may prefer to have free shipping. These preferences may be defined by the user or learned based on the knowledgebase of transactions. For example, the knowledgebase may be used to identify patterns of payment device selection. Accordingly, when the payment processing system determines that the user uses a particular payment device routinely for gas purchases, the system may identify that particular payment device as a preferred payment device if the current transaction request is also for a gas purchase.

In step 630, the payment processing system may select one of the payment devices to use for the transaction request. Various selection (e.g., prioritization or ranking) methods may be applied including choosing a payment device with the highest financial benefit, choosing a payment device providing rewards for the matching the product category, selecting a payment device using user preferences and the like and/or combinations thereof. The selection methodology may be specified by the user (e.g., through the preferences) and/or defined by an external entity such as a financial institution. In some instances, the selection methodology may be defined by weighing or ranking different payment selection factors such as payment processing costs, rewards, discounts, offers and the like. Once a payment device is selected, payment for the requested transaction may be processed in step 635.

Although FIG. 6 illustrates that if a user has selected a payment device, contextual selection is not performed, in some arrangements, contextual selection may be performed even if the user has selected a payment device. In such environments, the user selection (e.g., determined in step 610) may serve as a default or fallback selection if the contextual selection process does not identify a more preferred payment device selection. In still other arrangements, the user selected payment device may simply be given additional weight when compared against other payment devices in the contextual payment device selection process. According to some aspects, a user selected payment device may be used unless a benefit of a card selected through the contextual selection process is greater than a specified threshold amount. For example, a user's selection of a payment device may be overridden if another payment device, as determined through the contextual selection process, would provide at least a $5 benefit (e.g., in reward points, a discount, coupon offer, etc.). In another example, the threshold for overriding a user's selection of a payment device may be based on a difference between a financial benefit of the user's selection and a financial benefit of a device selected using the contextual selection process. In other examples, a payment device might not be selected unless it has a minimum level of device and/or communication security (e.g., encryption, secure communication protocol, etc.).

Figure 7:
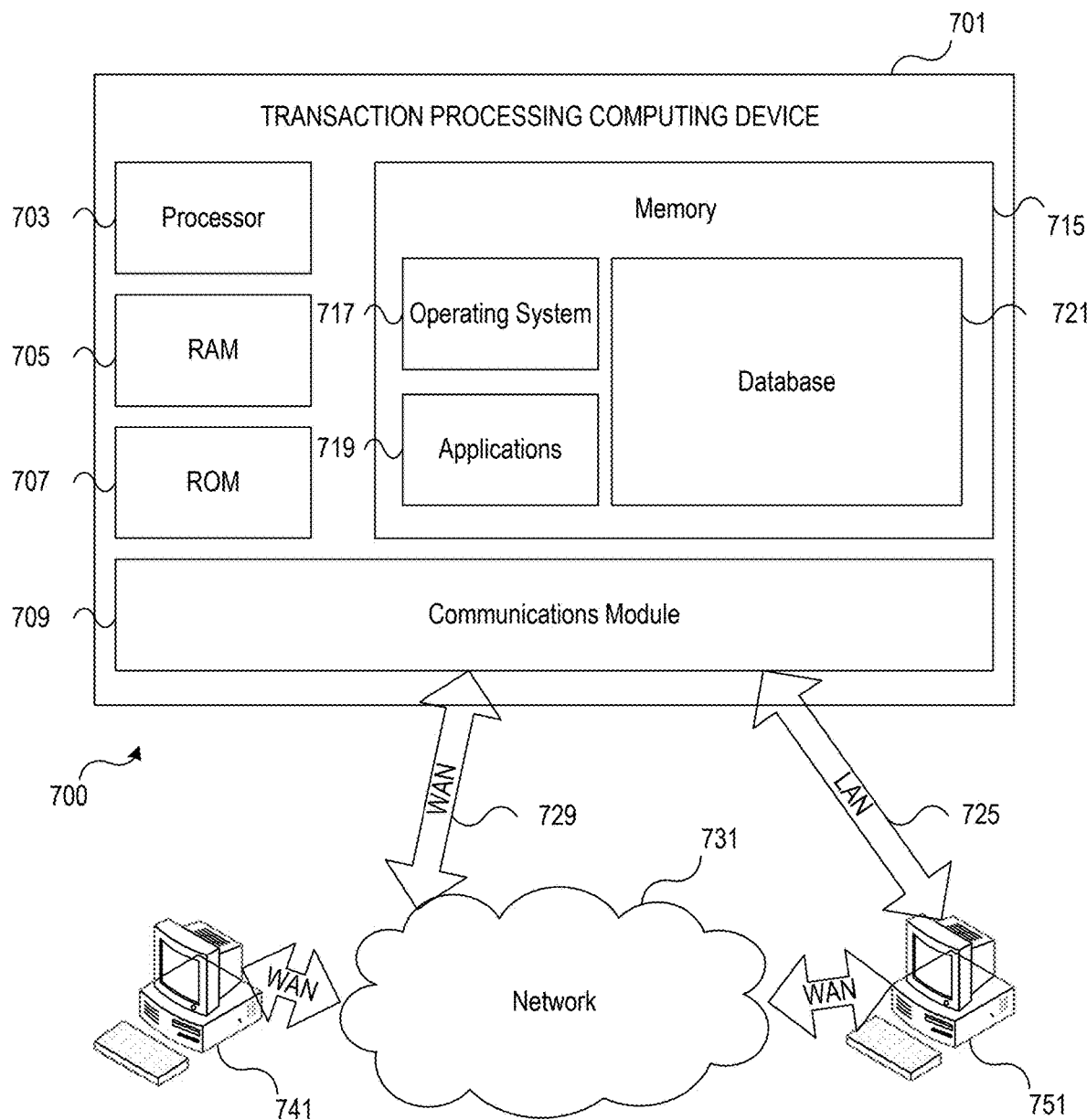
FIG. 7 illustrates an example computing system environment for generating and processing transactions according to one or more aspects described herein.

FIG. 7 depicts an illustrative operating environment in which various aspects of the present disclosure may be implemented in accordance with one or more example embodiments. The arrangements described with respect to FIG. 7 may be applied any devices shown and described herein. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include transaction processing computing device 701 having processor 703 for controlling overall operation of transaction processing computing device 701 and its associated components, including Random Access Memory (RAM) 705, Read-Only Memory (ROM) 707, communications module 709, and memory 715.

Transaction processing computing device 701 may include a variety of computer readable media. Computer readable media may be any available media that may be accessed by transaction processing computing device 701, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by transaction processing computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on transaction processing computing device 701. Such a processor may execute computer-executable instructions stored on a computer-readable medium.

Software may be stored within memory 715 and/or storage to provide instructions to processor 703 for enabling transaction processing computing device 701 to perform various functions as discussed herein. For example, memory 715 may store software used by transaction processing computing device 701, such as operating system 717, application programs 719, and associated database 721. Also, some or all of the computer executable instructions for transaction processing computing device 701 may be embodied in hardware or firmware. Although not shown, RAM 705 may include one or more applications representing the application data stored in RAM 705 while transaction processing computing device 701 is on and corresponding software applications (e.g., software tasks) are running on transaction processing computing device 701.

Communications module 709 may include a microphone, keypad, touch screen, and/or stylus through which a user of transaction processing computing device 701 may provide input, and may also include one or more of a speaker for providing audio output and a video display device for providing textual, audiovisual and/or graphical output. Computing system environment 700 may also include optical scanners (not shown).

Transaction processing computing device 701 may operate in a networked environment supporting connections to one or more remote computing devices, such as computing devices 741 and 751. Computing devices 741 and 751 may be personal computing devices or servers that include any or all of the elements described above relative to transaction processing computing device 701.

The network connections depicted in FIG. 7 may include Local Area Network (LAN) 725 and Wide Area Network (WAN) 729, as well as other networks. When used in a LAN networking environment, transaction processing computing device 701 may be connected to LAN 725 through a network interface or adapter in communications module 709. When used in a WAN networking environment, transaction processing computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method for automatically initiating transactions through a network, the method comprising:
   receiving, by an authorized computing device in a multi-device private network of a networked computing system and from a first computing device, a request to join the multi-device private network;
   determining, by the authorized computing device and based on receiving, from the first computing device, a token unique to the multi-device private network, that the first computing device is approved to join the multi-device private network;
   transmitting, by the authorized computing device and to the first computing device, communication and network protocol information enabling the first computing device to communicate with other devices in the multi-device private network;
   updating a device registry to add the first computing device to a plurality of computing devices within the multi-device private network;
   detecting, by the authorized computing device, a change in processing load associated with at least one computing device of the plurality of computing devices within the multi-device private network;
   in response to the detecting, transmitting, to each computing device of the plurality of computing devices within the multi-device private network, a signal including a polling request for data about each computing device of the plurality of computing devices within the multi-device private network;

receiving, in response to the polling request, data about each computing device of the plurality of computing devices;

based on the data about each computing device of the plurality of computing devices, removing, from the device registry, a second computing device of the plurality of computing devices within the multi-device private network;

transmitting, to each remaining computing device of the plurality of computing devices within the multi-device private network, updated membership data of the remaining computing devices of the plurality of computing devices within the multi-device private network;

detecting, by the networked computing system, a plurality of transactions initiated by one or more computing devices of the remaining computing devices of the plurality of computing devices within the multi-device private network, the multi-device private network providing access to a wide area network, wherein the networked computing system is configured to manage electronic transactions initiated by the one or more computing devices of the remaining computing devices of the plurality of computing devices in the multi-device private network;

storing, by the networked computing system, transaction attributes for the plurality of transactions in a transaction history database, the transaction attributes including one or more of: a cost, a quantity of a product, a date, or a device identifier;

automatically generating, by the networked computing system, a transaction triggering event, including:
 determining, based on sensor data received from computing devices of the remaining computing devices of the plurality of computing devices within the multi-device private network, a pattern of behavior from the plurality of transactions stored in the transaction history database, including identifying a recurring type of transaction for a particular product;
 upon determining the pattern of behavior:
  identifying one or more common transaction attributes between the plurality of transactions; and
  defining a transaction triggering condition requiring the identified one or more common transaction attributes; and implementing, by the networked computing system, the transaction triggering event, wherein the transaction triggering event is configured to cause the authorized computing device in the multi-device private network to generate, without user input and prior to transaction authorization, a transaction for purchasing a product upon the transaction triggering condition defined in the transaction triggering event being satisfied, wherein implementing the transaction triggering event includes:
 causing a computing device of the one or more computing devices of the remaining computing devices of the plurality of computing devices in the multi-device private network to monitor for the transaction triggering condition defined in the transaction triggering event; and
 causing a new transaction for purchasing the product to be generated, without user input, in response to determining that the transaction triggering condition has been met.

2. The method of claim 1, further comprising:
performing transaction authorization for the new transaction after the new transaction has been generated based on the transaction triggering event.

3. The method of claim 1, further comprising:
transmitting a notification to a user after generating the new transaction, the notification indicating that the transaction triggering condition defined in the transaction triggering event has been met, and requesting a confirmation from the user to process the generated new transaction.

4. The method of claim 2, wherein performing the transaction authorization includes authorizing the new transaction based on one or more user defined transaction rules.

5. The method of claim 4, further comprising:
upon determining that the new transaction is not authorized, automatically modifying, by the networked computing system, at least one parameter of the new transaction.

6. The method of claim 4, further comprising:
upon determining that the new transaction is not authorized based on the one or more user defined transaction rules, transmitting the new transaction to a user for authorization.

7. The method of claim 1, wherein the one or more common transaction attributes includes the date, and wherein the date is defined as a particular day of week or a particular day of month.

8. The method of claim 1, wherein the plurality of transactions includes at least three separate transactions, and wherein determining the pattern of behavior from the plurality of transactions includes:
determining that the at least three separate transactions are separated by a same amount of time; and
determining that the at least three separate transactions include a purchase for a particular product.

9. The method of claim 1, wherein the transaction attributes include a network communication security protocol.

10. A transaction processing apparatus in a multi-device private network comprising:
a processor; and
memory storing computer-readable instructions that, when executed, cause the transaction processing apparatus to:
 receive, by an authorized computing device in the multi-device private network and from a first computing device, a request to join the multi-device private network;
 determine, by the authorized computing device and based on receiving, from the first computing device, a token unique to the multi-device private network, that the first computing device is approved to join the multi-device private network;
 transmit, by the authorized computing device and to the first computing device, communication and network protocol information enabling the first computing device to communicate with other devices in the multi-device private network;
 update a device registry to add the first computing device to a plurality of computing devices within the multi-device private network;
 detect, by the authorized computing device, a change in processing load associated with at least one computing device of the plurality of computing devices within the multi-device private network;
 in response to the detecting, transmit, to each computing device of the plurality of computing devices within the multi-device private network, a signal including a polling request for data about each computing device of the plurality of computing devices within the multi-device private network;

receive, in response to the polling request, data about each computing device of the plurality of computing devices;

based on the data about each computing device of the plurality of computing devices, remove, from the device registry, a second computing device of the plurality of computing devices within the multi-device private network;

transmit, to each remaining computing device of the plurality of computing devices within the multi-device private network, updated membership data of the remaining computing devices of the plurality of computing devices within the multi-device private network;

detect a plurality of transactions initiated by one or more computing devices of the remaining computing devices of the plurality of computing devices within the multi-device private network, the multi-device private network providing access to a wide area network, wherein the transaction processing apparatus is configured to manage electronic transaction processing for the one or more computing devices of the remaining computing devices of the plurality of computing devices in the multi-device private network;

store transaction attributes for the plurality of transactions in a transaction history database, the transaction attributes including one or more of: a cost, a quantity of a product, a date, or a device identifier;

automatically generate a transaction triggering event, including:
  determining, based on sensor data received from computing devices of the remaining computing devices of the plurality of computing devices within the multi-device private network, a pattern of behavior from the plurality of transactions stored in the transaction history database, including identifying a recurring type of transaction for a particular product;
  upon determining the pattern of behavior:
    identifying one or more common transaction attributes between the plurality of transactions; and
    defining a transaction triggering condition requiring the identified one or more common transaction attributes; and implement the transaction triggering event, wherein the transaction triggering event is configured to cause the authorized computing device in the multi-device private network to generate, without user input and prior to transaction authorization, a transaction for purchasing a product upon the transaction triggering condition defined in the transaction triggering event being satisfied, wherein implementing the transaction triggering event includes:
  causing a computing device of the one or more computing devices of the remaining computing devices of the plurality of computing devices in the multi-device private network to monitor for the transaction triggering condition defined in the transaction triggering event; and
  causing a new transaction for purchasing the product to be generated, without user input, in response to determining that the transaction triggering condition has been met.

11. The transaction processing apparatus of claim 10, wherein the computer-readable instructions, when executed, further cause the transaction processing apparatus to:
  perform transaction authorization for the new transaction after the new transaction has been generated based on the transaction triggering event.

12. The transaction processing apparatus of claim 10, wherein the computer-readable instructions, when executed, further cause the transaction processing apparatus to:
  transmit a notification to a user after generating the new transaction, the notification indicating that the transaction triggering condition defined in the transaction triggering event have been met, and requesting a confirmation from the user to process the generated new transaction.

13. The transaction processing apparatus of claim 11, wherein performing the transaction authorization includes authorizing the new transaction based on one or more user defined transaction rules.

14. The transaction processing apparatus of claim 13, wherein the computer-readable instructions, when executed, further cause the transaction processing apparatus to:
  upon determining that the new transaction is not authorized, automatically modifying at least one parameter of the new transaction.

15. The transaction processing apparatus of claim 13, wherein the computer-readable instructions, when executed, further cause the transaction processing apparatus to:
  upon determining that the new transaction is not authorized based on the one or more user defined transaction rules, transmit the new transaction to a user for authorization.

16. A non-transitory computer-readable medium storing computer-readable instructions that, when executed, cause a transaction processing apparatus in a multi-device private network to:
  receive, by an authorized computing device in the multi-device private network and from a first computing device, a request to join the multi-device private network;
  determine, by the authorized computing device and based on receiving, from the first computing device, a token unique to the multi-device private network, that the first computing device is approved to join the multi-device private network;
  transmit, by the authorized computing device and to the first computing device, communication and network protocol information enabling the first computing device to communicate with other devices in the multi-device private network;
  update a device registry to add the first computing device to a plurality of computing devices within the multi-device private network;
  detect, by the authorized computing device, a change in processing load associated with at least one computing device of the plurality of computing devices within the multi-device private network;
  in response to the detecting, transmit, to each computing device of the plurality of computing devices within the multi-device private network, a signal including a polling request for data about each computing device of the plurality of computing devices within the multi-device private network;
  receive, in response to the polling request, data about each computing device of the plurality of computing devices;

based on the data about each computing device of the plurality of computing devices, remove, from the device registry, a second computing device of the plurality of computing devices within the multi-device private network;

transmit, to each remaining computing device of the plurality of computing devices within the multi-device private network, updated membership data of the remaining computing devices of the plurality of computing devices within the multi-device private network;

detect a plurality of transactions initiated by one or more computing devices of the remaining computing devices of the plurality of computing devices within a multi-device private network, the multi-device private network providing access to a wide area network;

store transaction attributes for the plurality of transactions in a transaction history database, the transaction attributes including one or more of: a cost, a quantity of a product, a date, or a device identifier;

generate a transaction triggering event, including:
- determining, based on sensor data received from computing devices of the remaining computing devices of the plurality of computing devices within the multi-device private network, a pattern of behavior from the plurality of transactions stored in the transaction history database;
- upon determining the pattern of behavior:
  - identifying one or more common transaction attributes between the plurality of transactions; and
  - defining a transaction triggering condition requiring the identified one or more common transaction attributes; and implement the transaction triggering event, wherein the transaction triggering event is configured to cause the authorized computing device in the multi-device private network to generate, without user input, a transaction for purchasing a product upon the transaction triggering condition defined in the transaction triggering event being satisfied.

17. The non-transitory computer-readable medium of claim 16, wherein the computer-readable instructions, when executed, further cause the transaction processing apparatus to:

determine that the transaction triggering condition defined in the transaction triggering event have been met; and
generate a new transaction for the one or more devices in the multi-device private network.

18. The non-transitory computer-readable medium of claim 17, wherein the computer-readable instructions, when executed, further cause the transaction processing apparatus to:

transmit a notification to a user after generating the new transaction, the notification indicating that the transaction triggering condition defined in the transaction triggering event have been met, and requesting a confirmation from the user to process the generated new transaction.

19. The non-transitory computer-readable medium of claim 17, wherein the computer-readable instructions, when executed, further cause the transaction processing apparatus to authorize the new transaction based on one or more user defined transaction rules.

20. The non-transitory computer-readable medium of claim 19, wherein the computer-readable instructions, when executed, further cause the transaction processing apparatus to:

upon determining that the new transaction is not authorized, modifying at least one parameter of the new transaction.

* * * * *